United States Patent
Peralta Calvo et al.

(10) Patent No.: US 12,088,433 B2
(45) Date of Patent: Sep. 10, 2024

(54) METHODS AND APPARATUS FOR PERFORMING CHANNEL ESTIMATION ON FLEXIBLE DUPLEXING SLOTS BASED ON ADDITIONAL ASSISTANCE INFORMATION SIGNALS FROM AT LEAST ONE NEIGHBOR BASE STATION

(71) Applicant: NOKIA TECHNOLOGIES OY, Espoo (FI)

(72) Inventors: Elena Peralta Calvo, Tampere (FI); Roberto Maldonado, Aalborg (DK); Nhat-Quang Nhan, Reims (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 20 days.

(21) Appl. No.: 18/165,393

(22) Filed: Feb. 7, 2023

(65) Prior Publication Data

US 2024/0267261 A1  Aug. 8, 2024

(51) Int. Cl.
*H04L 5/12* (2006.01)
*H04L 5/00* (2006.01)
*H04L 25/02* (2006.01)

(52) U.S. Cl.
CPC ........ *H04L 25/0202* (2013.01); *H04L 5/0005* (2013.01); *H04L 5/0073* (2013.01)

(58) Field of Classification Search
CPC .. H04L 25/0202; H04L 5/0005; H04L 5/0073
USPC .............. 375/262, 260, 259, 219, 295, 316
See application file for complete search history.

(56) References Cited

U.S. PATENT DOCUMENTS

2016/0056878 A1\* 2/2016 Ohwatari ............... H04J 11/005
455/501

OTHER PUBLICATIONS

"3rd Generation Partnership Project; Technical Specification Group Radio Access Network; NR; Multiplexing and channel coding (Release 17)", 3GPP TS 38.212 v17.4.0, (Dec. 2022), 202 pages.
"3rd Generation Partnership Project; Technical Specification Group Radio Access Network; NR; NR and NG-RAN Overall Description; Stage 2 (Release 17)", 3GPP TS 38.300 v17.3.0, (Dec. 2022), 210 pages.
"3rd Generation Partnership Project; Technical Specification Group Radio Access Network; NR; Physical channels and modulation (Release 17)", 3GPP TS 38.211 v17.4.0, (Dec. 2022), 136 pages.

(Continued)

*Primary Examiner* — Zewdu A Kassa
(74) *Attorney, Agent, or Firm* — ALSTON & BIRD LLP (57) ABSTRACT

Techniques are provided for facilitating channel estimation to mitigate cross-link interference between a base station in a first cell and at least one neighbor base station. In the context of a method performed by the base station, an indication for assistance information to support channel estimation is provided from the base station to at least one neighbor base station. The method also includes receiving assistance information from at least one neighbor base station. The method further includes causing a time-frequency muting pattern to be signaled to at least one user equipment in a first cell. The method also includes estimating an interference covariance matrix from an interfering link of the at least one neighbor base station based at least in part on the assistance information and estimating the desired signal based on the interference covariance matrix. Corresponding method, apparatus and computer-readable storage mediums are also provided for a base station.

33 Claims, 6 Drawing Sheets

(56) References Cited

OTHER PUBLICATIONS

"3rd Generation Partnership Project; Technical Specification Group Radio Access Network; Study on Network-Assisted Interference Cancellation and Suppression (NAIC) for LTE (Release 12)", 3GPP TR 36.866 v12.0.1, (Mar. 2014), 64 pages.

"3rd Generation Partnership Project; Technical Specification Group Radio Access Network; Study on New Radio Access Technology Physical Layer Aspects (Release 14)", 3GPP TR 38.802 v14.2.0, (Sep. 2017), 145 pages.

CMCC (Moderator), "New SI: Study on Evolution of NR Duplex Operation", 3GPP TSG RAN #94-3, RP-213591, (Dec. 6-17, 2021), 5 pages.

Guo et al., "Dynamic TDD and interference management towards 5G," 2018 IEEE Wireless Communications and Networking Conference (WCNC), (Apr. 2018), 6 pages.

Nokia et al., "Dynamic TDD Enhancements", 3GPP TSG RAN WG1 #111, R1-2212285, (Nov. 14-18, 2022), 13 pages.

Qualcomm Incorporated, "On Potential Enhancements On Dynamic/Flexible TDD", 3GPP TSG RAN WG1 Meeting #111, R1-2212116, (Nov. 14-18, 2022), 33 pages.

\* cited by examiner

METHODS AND APPARATUS FOR PERFORMING CHANNEL ESTIMATION ON FLEXIBLE DUPLEXING SLOTS BASED ON ADDITIONAL ASSISTANCE INFORMATION SIGNALS FROM AT LEAST ONE NEIGHBOR BASE STATION

TECHNOLOGICAL FIELD

An example embodiment relates generally to techniques for wireless communication and, more particularly, to techniques for taking action, for example, for providing for mitigation of interference, in response to measurement results that are based on one or more additional assistance information signals from one or more neighbor base stations.

BACKGROUND

A traditional frequency division duplex (FDD) system is configured to use separate frequencies for the downlink for a communication device and the uplink for a communication device. A traditional time division duplex (TDD) system is configured to use a single frequency for both the uplink and downlink, while separating the uplink and downlink in time. In contrast to traditional FDD and TDD systems, communication devices may be able to utilize full/flexible duplexing (FDU) to simultaneously communicate via uplink and/or downlink transmissions.

In communication systems, one or more base stations may establish a radio resource control (RRC) connection with one or more user equipment (UE). The one or more base stations and/or the one or more UE may cause uplink (UL) and/or downlink interference (DL) with each other. In an FDU system, for example, transmission by a base station in DL may create self-interference with UL reception by the same base station. As another example, inter-cell-interference may be created in instances in which transmission in DL by one base station creates cross-link interference (CLI) with the UL reception of another base station. CLI may also be created by a sector of the same base station so as to result in intra-cell interference. In order to mitigate base station to base station CLI in FDU, a base station may obtain assistance information from multiple neighboring base stations to apply mechanisms in an effort to mitigate base station to base station CLI.

BRIEF SUMMARY

Various embodiments generally relate to a technique for facilitating simultaneous uplink and/or downlink transmission, such as by signaling time-frequency muting patterns to a user equipment and estimating an interference covariance matrix while the user equipment is muted to permit a desired signal to be demodulated based on the interference covariance matrix. Based on the interference covariance estimate, receiver linear detection may be applied to the desired signal and the estimate of the desired signal is then used for demodulation and decoding. In this regard, the mitigation or removal of base station to base station CLI may require muting resources in the uplink transmissions of the serving cell to enhance the covariance estimation accuracy of advanced receivers to support full/flexible duplexing.

In an example embodiment, a method is provided that includes causing an indication to be provided to at least one neighbor base station that assistance information to support interference channel estimation should be provided. The method also includes receiving assistance information from the at least one neighbor base station. The method further includes causing a time-frequency muting pattern to be signaled by a base station to at least one user equipment (UE) in a first cell based in part on the received assistance information. The method further includes, while the at least one UE is muted in accordance with the time-frequency muting pattern, estimating an interfering covariance matrix from an interfering link of the at least one neighbor base station based at least in part on the assistance information and estimating the desired signal based on the interference covariance matrix.

In a method of an example embodiment, the assistance information comprises information regarding a demodulation reference signal (DMRS). In an example embodiment, the DMRS comprises at least one of: one or more DMRS parameters of the at least one neighbor base station, one or more of the antenna ports of the at least one neighbor base station, a DMRS configuration profile of the at least one neighbor base station, or a default DMRS configuration of the at least one neighbor base station. In this example embodiment, the assistance information may also include information regarding frequency domain resource assignment of the DMRS from at least one neighbor base station and/or information regarding a time domain resource assignment of the DMRS from at least one neighbor base station.

The time-frequency muting patterns may include scheduling information regarding a frequency domain resource allocation and a time domain resource allocation to be provided to the at least one user equipment. In an example embodiment, the time frequency muting pattern to be signaled includes indicating to a user equipment (UE) one or more uplink resources to mute based on a DMRS pattern. In this example embodiment, the time frequency muting pattern to be signaled comprises indicating to the at least one user equipment to mute a subset of orthogonal frequency division multiplexing (OFDM) symbols in which DMRS symbols are allocated. In this embodiment, the time frequency muting pattern to be signaled comprises indicating to the at least one user equipment to mute across an entire bandwidth or to mute across a portion of the entire bandwidth based on a frequency domain resource assignment in the assistance information on orthogonal frequency division multiplexing (OFDM) symbols in which DMRS symbols are allocated. In this embodiment, the time frequency muting pattern to be signaled comprises indicating to the at least one user equipment to shift DMRS transmission of the at least one user equipment away from DMRS symbols of at least one neighbor base station. In this embodiment, at least a subset of orthogonal frequency division multiplexing (OFDM) symbols in which DMRS symbols are allocated after shifting is used for uplink channel estimation. In an example embodiment, the time frequency muting pattern to be signaled comprises configuring the UE to mute a bandwidth for a demodulation reference signal (DMRS) symbol utilized for channel estimation in a cross-link interference slot.

In another example embodiment, an apparatus is provided that includes at least one processor and at least one memory storing instructions that, when executed by the at least one processor, cause the apparatus at least to initiate an indication to be provided to at least one neighbor base station that assistance information should be provided. The apparatus is also caused to receive assistance information from the at least one neighbor base station. The apparatus is further caused to cause a time-frequency muting pattern to be signaled by a base station in to at least one user equipment in a first cell based at least in part on the received assistance information. The apparatus is further caused, while the at least one user equipment is muted in accordance with the time-frequency muting pattern, to estimate an interference covariance matrix from an interfering link of the at least one neighbor base station based at least in part on the assistance information and estimate the desired signal based on the interference covariance matrix.

In an example embodiment, the assistance information comprises information regarding a demodulation reference signal (DMRS), and the information regarding the DMRS comprises at least one of: one or more DMRS parameters of the at least one neighbor base station, one or more of the antenna ports of the at least one neighbor base station, a DMRS configuration profile of the at least one neighbor base station, or a default DMRS configuration of the at least one neighbor base station. In this example embodiment, the assistance information may further comprise information that regards a frequency domain resource assignment of the DMRS from at least one neighbor base station and/or information that regards a time domain resource assignment of the DMRS from at least one neighbor base station.

The time frequency muting pattern that is signaled by the apparatus of an example embodiment comprises schedule information regarding a frequency domain resource allocation and a time domain resource allocation to be provided to the at least one user equipment. In an example embodiment, the time-frequency muting pattern to be signaled comprises an indication to the at least one user equipment (UE) of one or more uplink resources to mute based on a DMRS pattern. In this embodiment, the apparatus causes the time frequency muting pattern to be signaled by indicating to the user at least one equipment to mute a subset of orthogonal frequency division multiplexing (OFDM) symbols in which DMRS symbols are allocated. In this embodiment, the apparatus causes the time frequency muting pattern to be signaled by indicating to the at least one user equipment to mute across an entire bandwidth or to mute across a portion of the entire bandwidth based on a frequency domain resource assignment in the assistance information on orthogonal frequency division multiplexing (OFDM) symbols in which DMRS symbols are allocated. In this embodiment, the apparatus causes the time frequency muting pattern to be signaled by indicating to the at least one user equipment to shift DMRS transmission of the at least one user equipment away from DMRS symbols of at least one neighbor base station. In this example embodiment, at least a subset of orthogonal frequency division multiplexing (OFDM) symbols in which DMRS symbols are allocated after shifting is used for uplink channel estimation. In an example embodiment, the apparatus is caused to signal the time-frequency muting pattern by configuring the UE to mute a bandwidth for a demodulation reference signal (DMRS) symbol utilized for channel estimation in a cross-link interference slot.

In a further example embodiment, a non-transitory computer-readable storage medium is provided that includes program instructions stored thereon for causing an indication to be provided to at least one neighbor base station that assistance information to support interference channel estimation should be provided. The program instructions are also for receiving assistance information from the at least one neighbor base station. The program instructions are also for causing a time-frequency muting pattern to be signaled by a base station to at least one user equipment in a first cell based at least in part on the received assistance information. The program instructions are also for, while the at least one user equipment is muted in accordance with the time-frequency muting pattern, estimating an interference covariance matrix from an interfering link of the at least one neighbor base station based at least in part on the assistance information and estimating the desired signal based on the interference covariance matrix.

In an example embodiment, the assistance information comprises information regarding a demodulation reference signal (DMRS) which, in turn, comprises at least one of: one or more DMRS parameters of the at least one neighbor base station, one or more of the antenna ports of the at least one neighbor base station, a DMRS configuration profile of the at least one neighbor base station, or a default DMRS configuration of the at least one neighbor base station. In this example embodiment, the assistance information may further comprise information regarding frequency domain resource assignment of the DMRS from at least one neighbor base station and/or information regarding a time domain resource assignment of the DMRS from at least one neighbor base station.

The program instructions for initiating the channel estimation process in accordance with an example embodiment include program instructions for causing the time-frequency muting pattern to be signaled by causing scheduling information regarding a frequency domain resource allocation and a time domain resource allocation to be provided to the at least one user equipment. In an example embodiment, the program instructions for channel estimation include program instructions for causing the time-frequency muting pattern to be signaled by indicating to the at least one user equipment (UE) one or more uplink resources to mute based on a DMRS pattern. In this embodiment, the program instructions include instructions for causing the muting pattern to be signaled by indicating to the at least one user equipment to mute a subset of the orthogonal frequency division multiplexing (OFDM) symbols in which DMRS symbols are allocated. In this embodiment, the program instructions include instructions for causing the muting pattern to be signaled by indicating to the at least one user equipment to mute across an entire bandwidth or to mute across a portion of the entire bandwidth based on a frequency domain resource assignment in the assistance information on orthogonal frequency division multiplexing (OFDM) symbols in which DMRS symbols are allocated. In this embodiment, the program instructions include instructions for causing the muting pattern to be signaled by indicating to the at least one user equipment to shift DMRS transmission of the user equipment away from DMRS symbols of at least one neighbor base station. In this example embodiment, at least a subset of orthogonal frequency division multiplexing (OFDM) symbols in which DMRS symbols are allocated is used after shifting for uplink channel estimation. In an example embodiment, the program instructions for channel estimation include program instructions for causing the muting pattern to be signaled by configuring the UE to mute a bandwidth for a demodulation reference signal (DMRS) symbol utilized for channel estimation in a cross-link interference slot.

In a further example embodiment, an apparatus is provided that includes means for causing an indication to be provided to at least one neighbor base station that assistance information to support interference channel estimation should be provided. The apparatus also includes means for receiving assistance information from the at least one neighbor base station. The apparatus further includes means for causing a time-frequency muting pattern to be signaled by a base station to at least one user equipment (UE) in a first cell based in part on the received assistance information. The apparatus further includes means for, while the at least one UE is muted in accordance with the time-frequency muting pattern, estimating an interfering covariance matrix from an interfering link of the at least one neighbor base station based at least in part on the assistance information and estimating the desired signal based on the interference covariance matrix.

In an apparatus of an example embodiment, the assistance information comprises information regarding a demodulation reference signal (DMRS). In an example embodiment, the DMRS comprises at least one of: one or more DMRS parameters of the at least one neighbor base station, one or more of the antenna ports of the at least one neighbor base station, a DMRS configuration profile of the at least one neighbor base station, or a default DMRS configuration of the at least one neighbor base station. In this example embodiment, the assistance information may also include information regarding frequency domain resource assignment of the DMRS from at least one neighbor base station and/or information regarding a time domain resource assignment of the DMRS from at least one neighbor base station.

In an example embodiment, the time-frequency muting patterns include scheduling information regarding a frequency domain resource allocation and a time domain resource allocation to be provided to the at least one user equipment. In an example embodiment, the time frequency muting pattern to be signaled includes indicating to the at least one user equipment (UE) one or more uplink resources to mute based on a DMRS pattern. In this example embodiment, the time frequency muting pattern to be signaled comprises indicating to the at least one user equipment to mute a subset of orthogonal frequency division multiplexing (OFDM) symbols in which DMRS symbols are allocated. In this embodiment, the time frequency muting pattern to be signaled comprises indicating to the at least one user equipment to mute across an entire bandwidth or to mute across a portion of the entire bandwidth based on a frequency domain resource assignment in the assignment information on orthogonal frequency division multiplexing (OFDM) symbols in which DMRS symbols are allocated. In this embodiment, the time frequency muting pattern to be signaled comprises indicating to the at least one user equipment to shift DMRS transmission of the at least one user equipment away from DMRS symbols of at least one neighbor base station. In this embodiment, at least a subset of orthogonal frequency division multiplexing (OFDM) symbols in which DMRS symbols are allocated after shifting is used for uplink channel estimation. In an example embodiment, the time frequency muting pattern to be signaled comprises configuring the UE to mute a bandwidth for a demodulation reference signal (DMRS) symbol utilized for channel estimation in a cross-link interference slot.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Having thus described certain example embodiments of the present disclosure in general terms, reference will hereinafter be made to the accompanying drawings, which are not drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including," and variants thereof are used in either the detailed description or the claims, these terms are intended to be inclusive in a manner similar to the term "comprising."

The phrases "in one embodiment," "according to one embodiment," "in some embodiments," "in various embodiments", and the like generally refer to the fact that the particular feature, structure, or characteristic following the phrase may be included in at least one embodiment of the present disclosure, but not necessarily all embodiments of the present disclosure. Thus, the particular feature, structure, or characteristic may be included in more than one embodiment of the present disclosure such that these phrases do not necessarily refer to the same embodiment.

As used herein, the terms "example," "exemplary," and the like are used to mean "serving as an example, instance, or illustration." Any implementation, aspect, or design described herein as "example" or "exemplary" is not necessarily to be construed as preferred or advantageous over other implementations, aspects, or designs. Rather, use of the terms "example," "exemplary," and the like are intended to present concepts in a concrete fashion.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Examples of non-transitory computer-readable media may include, but are not limited to, one or more types of hardware memory, non-transitory tangible media (for example, one or more magnetic storage disks, one or more optical disks, one or more USB flash drives), computer system memory or random-access memory (such as, DRAM, SRAM, EDO RAM), and the like.

Figure 1:
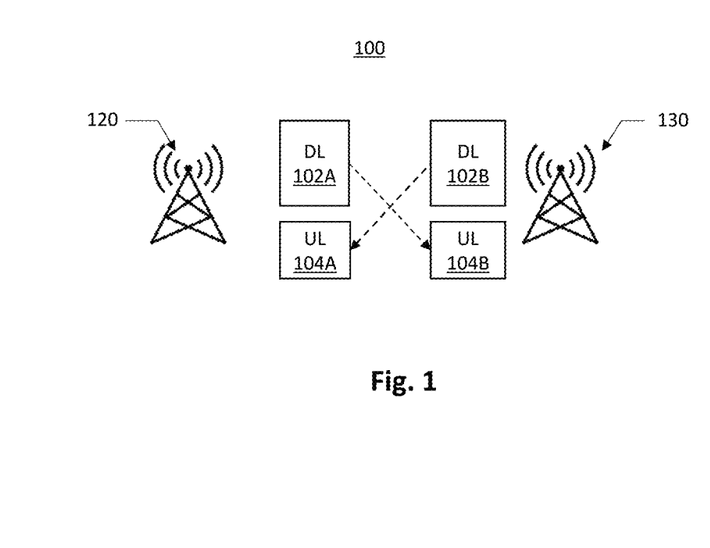
FIG. 1 illustrates an example configuration of inter-base station interference.

As illustrated in FIG. 1, a communication system 100 is provided in accordance with various embodiments of the present disclosure. In some embodiments, the communication system 100 comprises at least one user equipment (UE) 110, at least one neighbor base station 120, and a base station 130 of a first cell. The at least one neighbor base, the base station of the first cell and/or the UE may be configured to operate in one or more frequency bands. For example, the at least one neighbor base station may be configured to also operate in the FR2 band and/or the base station may be configured to operate in the FR1 band. Regardless of the band, the apparatus, method and computer program product of an example embodiment are configured to implement a channel estimation process as described herein that is based upon assistance information provided by the at least one neighboring base station 120 to the base station 130 in order to mitigate cross-link interference (CLI) between the base stations, one or more UEs, and/or any combination thereof.

By way of example, the system 100 may be deployed within a radio access architecture based on long term evolution advanced (LTE Advanced, LTE-A) and/or new radio (NR, 5G). However, the system may be deployed in other network architectures including within other communication networks including, for example, other communication networks developed in the future, e.g., sixth generation (6G) networks, as well as any of a number of existing networks including a universal mobile telecommunications system (UMTS) radio access network (UTRAN or E-UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The UE 110 may be any type of user terminal, terminal device, etc. to which resources on the air interface are allocated and assigned. For example, the UE may be a portable computing device such as a wireless mobile communication device including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. The user equipment may also be called a subscriber unit, mobile station, remote terminal, access terminal, user terminal or user equipment (UE) just to mention but a few names or apparatuses.

The at least one neighbor base station 120 and the base station 130, is a network element and may be embodied by any of a variety of access points. For example, the cells may be embodied by a base station, a Node B, e.g., a gNB, or the like.

Referring to FIG. 1, an example communication system 100 demonstrating inter-cell cross-link interference (CLI) is provided. This inter-cell CLI is addressed by various embodiments of the present disclosure. In some embodiments, at least one neighbor base station 120 may be configured to communicate with a base station 130 of a first cell. In various embodiments, the at least one neighbor base station 120 may be configured to transmit on a downlink (DL) 102A to the base station 130 that receives the signals on an uplink (UL) 104B. As shown, the base station 130 may also transmit on a downlink 102B to the neighbor base station 120 that receives the signal on an uplink 104A. However, at least partial, cross-link interference (CLI) may be experienced by the uplink and downlink transmissions between the at least one neighbor base station and/or the base station. In the depicted embodiment, the CLI may be between, for example, a downlink 102A transmission from at least one neighbor base station 120 and a base station of the first cell that is receiving an uplink signal at the same time on non-overlapping resources or physical resource blocks (PRBs). In various embodiments, the cross-link interference (CLI) between at least one neighbor base station 120 and/or the base station 130 may depend on the physical location of the one or more base stations.

Figure 2A:
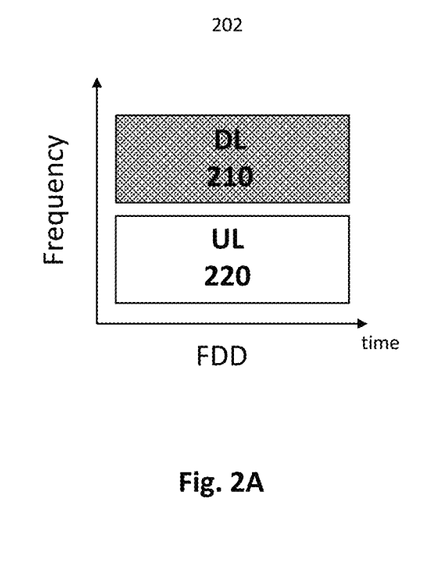
FIG. 2A illustrates an example configuration of frequency division duplexing (FDD)
Figure 2B:
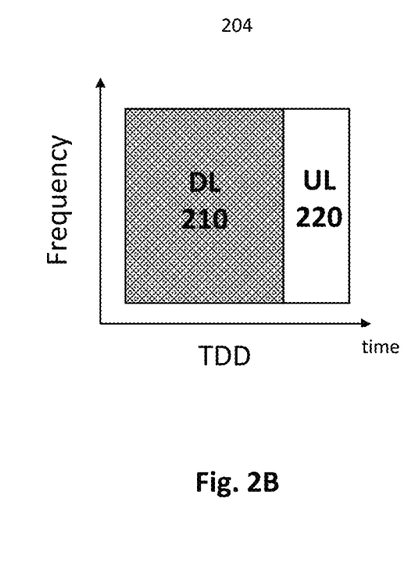
FIG. 2B illustrates an example configuration of time domain duplexing (TDD)
Figure 2C:
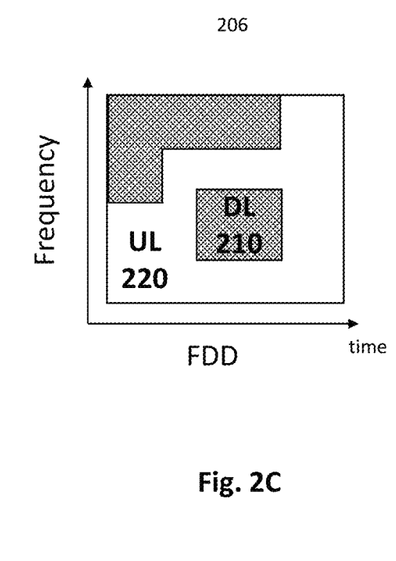
FIG. 2C illustrates an example configuration of full duplex/flexible duplex (FDU)

FIG. 2C illustrates flexible/full duplexing 206 which is utilized in accordance with an example embodiment and is contrasted to frequency division duplexing and time division duplexing of FIGS. 2A and 2B, respectively. In this regard, referring to FIG. 2A, an example representation of frequency division duplexing 202, such as supported by new radio for paired bands, is provided in accordance with various embodiments of the present disclosure. In some embodiments, frequency division duplexing (FDD) is configured to transmit downlink (DL) transmissions 210 and uplink (UL) 220 transmissions in different spectrum frequencies. In various embodiments, 5G may be configured to use 27500.5 MHz to 28349.5 MHz to assist with the transmission of one or more DLs and/or one or more ULs simultaneously and/or individually. In an example embodiment, DL may be configured to refer to a transmission from a base station to a use equipment (UE) and/or an UL may be configured to refer to a transmission from a UE to a base station.

Referring to FIG. 2B, an example representation of time domain duplexing 204, such as supported by new radio for unpaired bands, is provided in accordance with various embodiments of the present disclosure. In some embodiments, time domain duplexing (TDD) is configured to transmit downlink (DL) transmissions 210 and uplink (UL) 220 transmissions in the same frequency at different time instances. In the depicted embodiments, the DL 210 transmission may be configured to be transmitted by one or more base stations and/or one or more user equipment (UE) before the transmission of the UL 220. In one or more example embodiments, the one or more base stations and/or one or more user equipment (UE) may be configured to transmit the UL 220 before the DL 210 transmission (not depicted). Since the time domain resource is split between uplink and downlink, the uplink in TDD has only a limited time duration, leading to reduced coverage, increased latency and reduced capacity.

Referring to FIG. 2C, an example representation of flexible/full duplexing 206 is provided in accordance with various embodiments of the present disclosure. In various embodiments, the flexible/full duplexing (FDU) may be configured to allow for simultaneous downlink (DL) 210 and uplink (UL) 220 transmissions from one or more base stations and/or one or more user equipment (UE) in order to address at least some of the shortcomings of TDD and FDD systems. In various embodiments, the FDU may be configured to support simultaneous downlink and uplink transmission on one or more different PRB(s) of the one or more base stations and/or one or more UE within an unpaired wideband new radio (NR) carrier. In one or more embodiments, the one or more PRB(s) may be utilized to schedule transmission of either a DL transmission and/or UL transmission. Further, the one or more PRB(s) comprise different subcarrier slots within the frequency domain, while the one or more PRB(s) maintain a single slot within the time domain. Therefore, one or more base stations and/or one or more UE may be configured to utilize one or more non-overlapping PRB(s) to schedule DL transmissions and UL transmissions simultaneously, while mitigating cross-link interference (CLI) between two or more therebetween.

Figure 3:
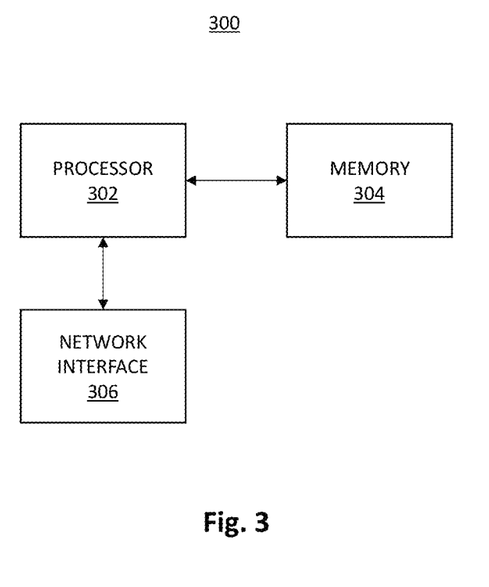
FIG. 3 illustrates a block diagram of a communication system in accordance with an example embodiment of the present disclosure.

Referring to FIG. 3, an example apparatus 300 is provided. The apparatus 300 may be embodied by various computing devices, network device or the like. In an example embodiment, however, the apparatus 300 may be an embodied by, associated with or in communication with a network element, such as the base station 130 of the first cell.

The apparatus 300 may include processor 302, memory 304, and network interface 306. The apparatus 300 may be configured to execute the operations described herein. Although these components are described with respect to the performance of various functions, it should be understood that the particular implementations necessarily include the use of particular hardware. It should also be understood that certain of these components may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may be configured to store information, data, content, applications, instructions, or the like for enabling the apparatus to carry out various functions in accordance with an example embodiment disclosed herein.

The processor 302 may be embodied in a number of different ways and may, for example, comprise processing circuitry or include one or more processing devices configured to perform independently. In some non-limiting embodiments, the processor 302 may include one or more processors configured in tandem via a bus to enable independent execution of instructions, pipelining, and/or multi-threading. The use of the term "processor" may be understood to include any of various types of processing circuitry including a single core processor, a multi-core processor, multiple processors internal to the apparatus, and/or remote or "cloud" processors.

In some embodiments, the processor 302 may be configured to execute instructions stored in the memory 304 and/or circuitry otherwise accessible to the processor 302. In some embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment disclosed herein while configured accordingly. Alternatively, as another example, when the processor 302 is embodied as an executor of software instructions, the instructions may specifically configure the processor 302 to perform the algorithms and/or operations described herein when the instructions are executed.

In some embodiments, the apparatus 300 may optionally include input/output circuitry that may, in turn, be in communication with processor 302 to provide output to a user and/or other entity and, in some embodiments, to receive an indication of an input. The input/output circuitry may comprise a user interface and may include a display, and may comprise a web user interface, a mobile application, a query-initiating computing device, a kiosk, or the like. In some embodiments, the input/output circuitry may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The network interface 306 may be any means such as a device or circuitry embodied in either hardware or a combination of hardware and software that is configured to receive and/or transmit data from/to a network and/or any other device, circuitry, or module in communication with the apparatus 300. In this regard, the network interface 306 may include, for example, a network interface for enabling communications with a wired or wireless communication network, such as at least one neighbor base station 120 and the base station 130. For example, the network interface 306 may include one or more network interface cards, antennae, buses, switches, routers, modems, and supporting hardware and/or software, or any other device suitable for enabling communications via a network. Additionally, or alternatively, the network interface 306 may include the circuitry for interacting with the antenna/antennae to cause transmission of signals via the antenna/antennae or to handle receipt of signals received via the antenna/antennae.

Figure 4A:
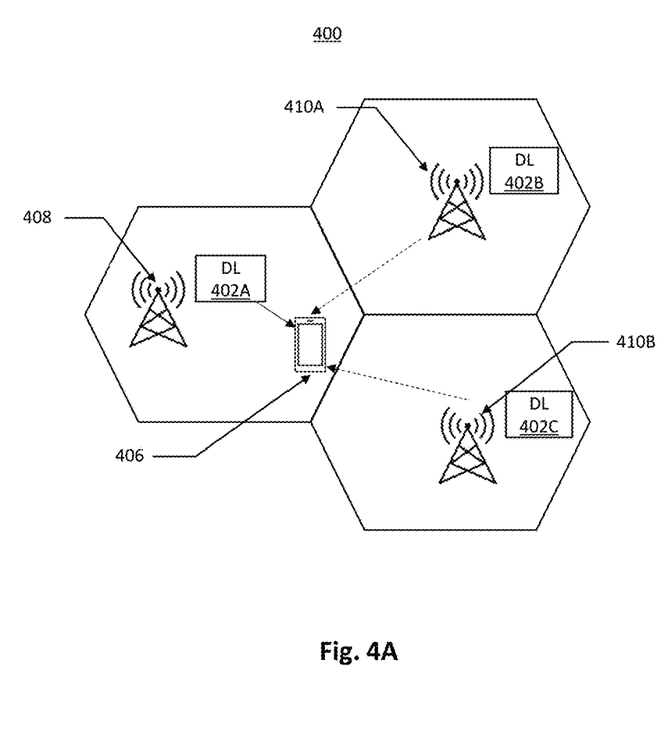
FIG. 4A illustrates an example system model of network-assisted interference cancellation and suppression (NAICS)
Figure 4B:
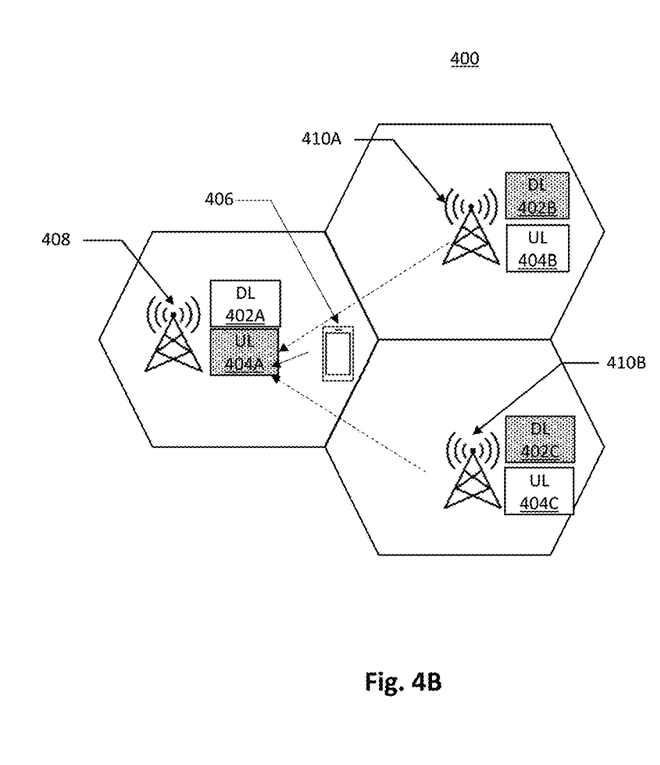
FIG. 4B illustrates an example system model of full duplex operation (FDU)

Referring to FIGS. 4A-4B, example configurations of a communication system 400 are provided. In some embodiments, the depicted communication systems 400 may be configured to mitigate and/or cancel cross-link interference (CLI) between a base station 408 and/or at least one neighbor 410A, 410B (collectively "410). With reference to FIG. 4A, in various embodiments, the base station 408 and/or the at least one neighbor base station 410 may be configured to apply a network-assisted interference cancellation and suppression (NAICS) technique via algorithms implemented by one or more advanced receivers in order to cancel and/or suppress the interference from respective downlink 402A, 402B, 402C (DL) transmissions of one or more neighbor base stations to the one or more UE 406. In various embodiments, the base station 408 and/or the at least one neighbor base station 410 may be configured in a manner in which only DL transmission may be signaled or only UL transmissions may be signaled.

With reference to FIG. 4B, in various embodiments, the base station 408 may be configured to communicate with at least one neighbor base station 410A, 410B (collectively "410) and/or one or more user equipment 406 (UE) simultaneously. In the depicted embodiment, the base station 408, the at least one neighbor base station 410, and/or the user equipment 406 (UE) may be configured to simultaneously transmit and/or receive downlink (DL) transmission 402A, 402B, 402C (collectively "402") and uplink (UL) transmission 404A, 404B 404C (collectively "404"). In various embodiments, the first base station 408 may be configured to apply flexible/full duplexing configuration (FDU) along with the at least one neighbor base station 410 and/or UE 406. The base station 408 may be configured to use one or more assistance information from the at least one neighbor base station 410 in order to determine the muting pattern configuration that, in turn, defines the muting pattern applied by the base station 408 to its serving UEs. In various embodiments, a first neighbor base station 410A and a second neighbor base station 410B may be configured to have the same DMRS configuration. In other embodiments, the first neighbor base station 410A and the second neighbor base station 410B may have different DMRS configurations. In various embodiments, the base station 408 may be configured to transmit the one or more muting patterns to the UE 406 in order to mitigate cross-link interference between the base station 408 and at least one neighbor base station 410.

Figure 5:
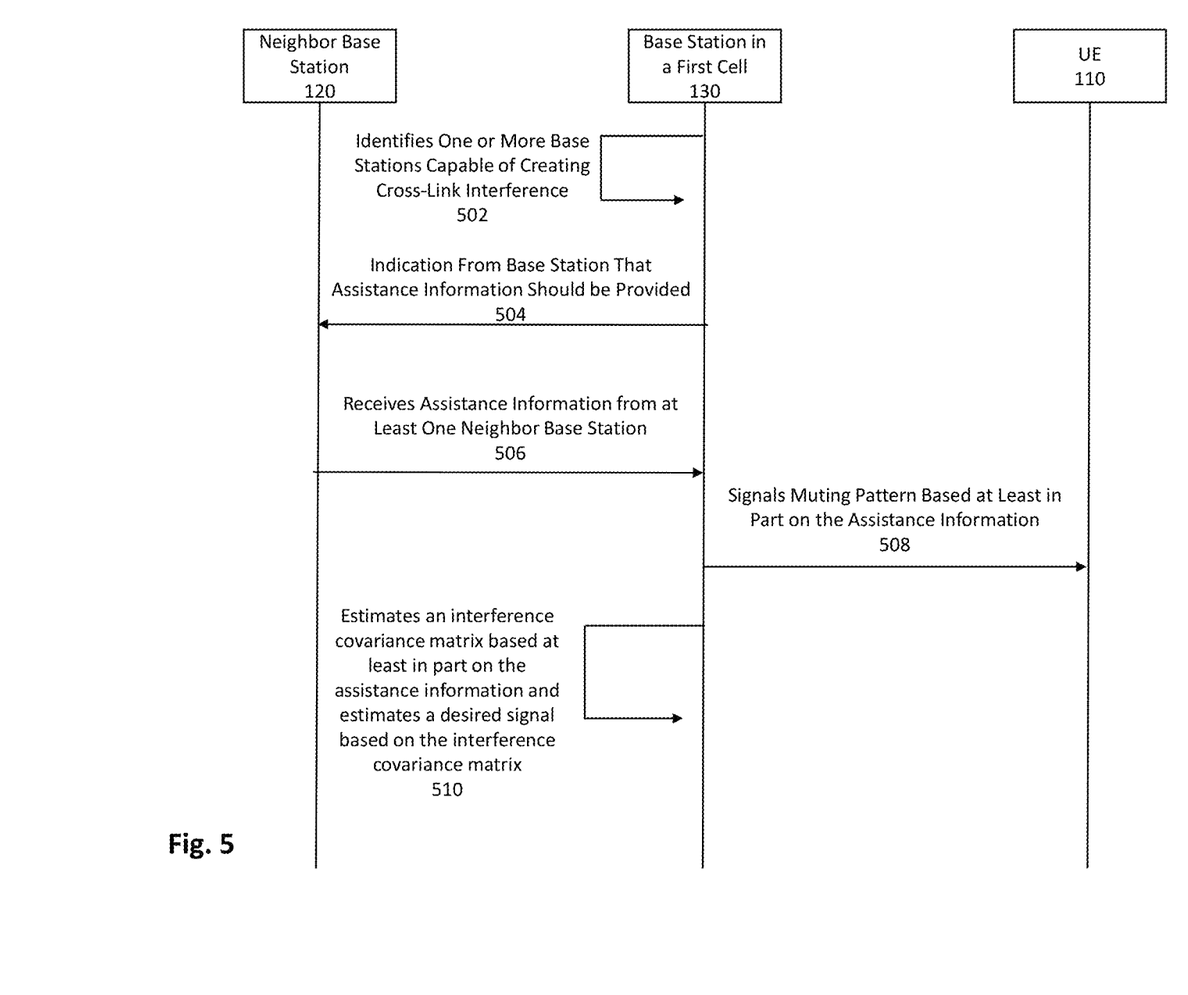
FIG. 5 illustrates a signal diagram of operation of a system in accordance with an example embodiment of the present disclosure.

FIG. 5 illustrates an example implementation of a signal flow in accordance with example embodiments in which a base station in a first cell is configured to communicate with at least one neighbor base station and/or one or more user equipment (UE) to mitigate cross-link interference (CLI) for downlink (DL) transmission and/or uplink (UL) transmission.

The establishment of flexible/full duplexing operations may be improved in various manners, such as muting resources to enhance channel measurement and estimation by obtaining assistance information from at least one neighbor base station and signaling the muting pattern to at least one user equipment (UE). In one or more example embodiments, the assistance information may comprise information regarding demodulation reference signal (DMRS). The DMRS may be configured to comprise at least one of: one or more DMRS parameters of at least one neighbor base station, one or more of the antenna ports of at least one neighbor base station, a DMRS configuration profile of at least one neighbor base station, and/or default DMRS configuration of at least one base station. In various embodiments, the assistance information may be configured to comprise information regarding frequency domain resource assignment of the DMRS from at least one neighbor base station. In various embodiments, the assistance information may further comprise information regarding time domain resource assignment of the DMRS from at least one neighbor base station. For example, at least one neighbor base station may transmit assistance information to the base station and the assistance information is configured to provide the base station with one or more non-overlapping PRB(s) that may be used to mitigate and/or cancel cross-link interference (CLI).

In various embodiments, the base station in a first cell may be configured to transmit a time-frequency muting pattern, based at least in part, on assistance information from at least one neighbor base station to one or more user equipment. In one or more embodiments, the time-frequency muting pattern transmitted to one or more UE from the base station in a first cell may comprise information regarding a frequency domain resource allocation and/or a time domain resource allocation. In various embodiments, the time-frequency muting pattern transmitted to one or more UE from the base station in a first cell may be configured to comprise an indication to the UE to mute a subset of orthogonal frequency division multiple (OFDM) symbols in which DMRS symbols are allocated. In various embodiments, the time-frequency muting pattern transmitted to one or more UE from the base station may be configured to configure the one or more UE to mute a bandwidth for a DMRS symbol that may be utilized for channel estimation in a cross-link interference (CLI) slot. As used herein, a UE that is muted, such as in accordance with the time-frequency muting pattern, does not transmit signals when muted.

In various embodiments, the time-frequency muting pattern to be signaled by the base station 130 in a first cell to the user equipment 110 may comprise indicating to the user equipment one or more uplink resources to mute based on a DMRS pattern. In various embodiments, the time-frequency muting pattern to be signaled by the base station in the first cell to the user equipment may comprise indicating to the user equipment to shift DMRS transmission of the user equipment away from the DMRS symbols of at least one neighbor base station. In various embodiments, one or more subset OFDM symbols in which DMRS symbols are allocated may be used for uplink channel estimation.

Returning to FIG. 5, at operation 502, the apparatus 300 associated with the base station 130 may include means, such as the processor 302 or the like, configured to identify one or more neighbor base stations 120 capable of creating a cross-link interference with the base station. The one or more neighbor base stations may be identified in various manners. For example, the one or more neighbor base stations may be predefined, such as by a listing maintained by the memory 304. Alternatively, the one or more neighbor base stations 120 may be identified as those neighbor base stations that are located in proximity to base station 130. Further, the one or more neighbor base stations 120 may be identified based on cross link interference (CLI) measurements between a respective neighbor base station and the base station 130. For example, the neighbor base station(s) 120 and the base station 130 may exchange their intended TDD downlink and uplink configurations, such as over Xn and F1 interfaces, and be configured to perform CLI measurements based on existing downlink reference signals (RS), such as non-zero power channel state information reference signals (NZP CSI-RS) or a synchronization signal block (SSB), exchanged between the base stations, from which the one or more neighbor cells may be identified.

As shown in operation 504, the apparatus 300 associated with the base station 130 includes means, such as the processor 302, the network interface 304 or the like, be configured to provide an indication to at least one neighbor base station 120 that assistance information to support interference channel estimation may need to be provided to the base station 130. The base station 130 in a first cell may be in communication with at least one neighbor base station 120 and/or one or more user equipment (UE) 110. The base station 130 may be configured to transmit a request to at least one neighbor base station 120 for assistance information regarding frequency domain resource assignment and/or time domain resource allocation of the DMRS from at least one neighbor base station 120. The at least one neighbor base station 120 may be configured to signal the assistance information back to the base station 130 in response to the indication. As shown in operation 506, the apparatus 300 associated with the base station 130 may therefore also include means, such as the processor 302, the network interface 306 or the like, configured to receive the assistance information transmitted from at least one neighbor base station 120, such as via an Xn interface. The assistance information may include at least one of the demodulation reference signals (DMRS) information, e.g., DMRS configuration, time domain resource assignment, frequency domain resource assignment and precoding information of one or more simultaneously scheduled neighbor base stations. The DMRS is UE specific with the sequence generation described in TS 38.211, e.g., Sections 6.4.1.1.1 or 7.4.1.1.1 for uplink and downlink with the DMRS-Downlink Configuration and/or the DMRS-Uplink Configuration for the UE 110 may be used to configure the downlink (DL) and/or uplink (UL) DMRS of the UE for one or more physical downlink data channel (PDSCH) and/or physical uplink data channel (PUSCH) via radio resource control (RRC). The pseudo-random sequence of the DMRS is initialized based on the cell ID ($N_{ID}^{cell}$) and/or scrambling ID ($n_{SCID} \in \{0,1\}$) signaled as additional assistance information by higher layer signaling to the base station 130.

By way of example of the one or more DMRS parameters that may be transmitted from the neighbor base station 120 to the base station 130 via higher level signaling are the DMRS configuration type, e.g., Type-1 or Type-2 DMRS provided via dmrs-Type, the scrambling ID, dmrs-AdditionalPosition, etc. The scrambling ID may be defined as $N_{ID}^{nSCID}$ for $n_{SCID} \in \{0,1\}$, given by the higher-layer parameters scramblingID0, $N_{ID}^{0}$, and scramblingID1, $N_{ID}^{1}$, or otherwise as $N_{ID}^{nSCID} = N_{ID}^{cell} = 3N_{ID}^{(1)} + N_{ID}^{(2)}$ where $N_{ID}^{(1)}$, $N_{ID}^{(2)}$ are defined from the primary synchronization signal (PSS) and the secondary synchronization signal (SSS), respectively. The dmrs-AdditionalPosition is the position of additional DMRS symbols within the slot, for instance to improve the channel estimation. In this regard, the number and positions of the additional DMRS OFDM symbols are determined based on this parameter (dmrs-AdditionalPosition) and the duration of the data channel slot as described in described in TS 38.211, e.g., Sections 6.4.1.1.1 or 7.4.1.1.1. The higher level signaling could be signaled inside a new radio resource control (RRC) information element (IE) that may be generated for this purpose.

In order to ensure orthogonality between the DMRS sequences, difference scrambling IDs and/or different antenna ports may be utilized. As such, the assistance information from at least one neighbor base station 120 may optionally further comprise not only information regarding one or more scramble IDs, but also information regarding one or more different antenna ports. The information regarding the antenna port(s) may be provided in various manners, but, in one embodiment, the one or more antenna port(s) of at least one neighbor base station 120 can be signaled by pointing to an entry of a predefined table (e.g., Tables 7.3.1.2.2-1, 7.3.1.2.2-2, 7.3.1.2.2-3, or 7.3.1.2.2-4 in TS 38.212, and/or the like).

In other embodiments configured to reduce the total signaling overhead, the assistance information may identify one or more profiles of neighbor base station DMRS configurations. The assistance information may identify to the base station 130 which corresponding profile to apply at a given scheduling occasion. Thus, for one or more parameters that are not explicitly provided by the DMRS configuration of a neighbor base station 120, the base station 130 defines the one or more parameters to have values corresponding to the predefined profile identified for the scheduling occasion.

In further embodiments, the assistance information may comprise a default DMRS configuration of at least one neighbor base station 120. In this embodiment, the base station 130 may request that at least one neighbor base station 120 maintain the default DMRS configuration for the physical downlink data channel (PDSCH) resources on cross-link interference (CLI) slots. The CLI slots are those slots in which CLI is expected.

In further embodiments, the assistance information may be configured to comprise information regarding frequency domain resource assignment of the at least one neighbor base station 120. This information is useful as, in contrast to time division duplexing, interference may be generated in full/flexible duplexing by transmissions on non-overlapping frequency resources. In this regard and in distinction to time division duplexing in which all the frequency resources within a slot are dedicated to either downlink or uplink, the non-overlapping resource blocks (RBs) of a given slot in full/flexible duplexing can be defined as downlink and uplink. Thus, the assistance information from the at least one neighbor base station 120 may further indicate one or more frequency/sub-band configurations of a slot where DMRS-based channel estimation may be performed. A neighbor base station 120 may indicate via RRC the RBs dedicated for uplink and the base station 130 may skip channel estimation on the frequency resources overlapping with the uplink subband(s) of the neighbor base station.

In further embodiments, the assistance information may be configured to comprise time domain resource allocation (TDRA) of at least one neighbor base station. The TDRA information of the at least one neighbor base station permits the exact location in time to be determined for DMRS pilots (e.g., in the case of a mini-slot configuration). Otherwise, in the absence of the TDRA, the same configuration may be assumed for all the links, that is, both base stations will use the same time division duplex pattern configuration and symbol allocation.

At operation 508 of FIG. 5, the apparatus 300 associated with the base station 130 may include means, such as the processor 302, network interface 304 or the like, for causing transmission of one or more time-frequency muting pattern(s) to at least one user equipment (UE) in a first cell, based at least in part, on the assistance information from at least one neighbor base station 120. The one or more time-frequency muting patterns may be transmitted in various manners, such as via radio resource control (RRC), media access control (MAC) control element (CE), and/or downlink control indicator (DCI). In various embodiments, the one or more time-frequency muting patterns may comprise information regarding the physical resource block (PRB) allocation, frequency domain resource assignment, and/or time domain resource allocation of the DMRS from at least one neighbor base station. In conjunction with signaling the time-frequency muting pattern, the apparatus 300 associated with the base station 130 may include means, such as the processor 302, the network interface 306 or the like, for signaling the UE 110, indicating the UE 110 one or more uplink resources to mute based on a DMRS pattern. In various embodiments, the apparatus 300 associated with the base station 130 may include means, such as the processor 302, the network interface 306 or the like, for signaling the UE 110, indicating the UE 110 to mute one or more resources based, at least in part, on a default DMRS configuration of at least one neighbor base station 120. In other embodiments, the apparatus 300 associated with the base station 130 may include means, such as the processor 302, the network interface 306 or the like, for signaling the UE 110, indicating the UE 110 to mute an entire bandwidth (BW) or to mute a portion of the entire bandwidth based on a frequency domain resource assignment in the assistance information for a DMRS symbol that may be used for channel estimation in cross-link interference (CLI) slot.

By muting uplink resources from the UE to the base station 130 in accordance with the time frequency muting pattern, the base station-to-base station interference channel measurement and estimation utilizing the DMRS may be enhanced in accordance with an example embodiment. In this regard, as the UE in the cell does not transmit in the resources indicated by the time-frequency muting pattern, there are no resources from the UE that collide with the resources transmitted by the neighbor base station 120. As such, the interference covariance matrix estimation at the base station 130 is improved and helps to improve the accuracy of an enhanced linear minimum mean square error interference rejection combining (LMMSE-IRC) receiver based on the improved base station-to-base station channel measurement and estimation in accordance with an example embodiment.

At operation 510, the apparatus 300 associated with the base station 130 includes means, such as the processor 302 or the like, for constructing an interference covariance matrix while the at least one user equipment is muted in accordance with the time-frequency muting pattern. In this regard, the apparatus 300 may include means, such as the processor 302 or the like, for estimating the interference covariance matrix from an interfering link of the at least one neighbor base station based at least in part on the assistance information. The base station 130 may be configured to apply one or more interference cancellation/rejection scheme(s) based, at least in part, on the assistance information from at least one neighbor base station 120. In various embodiments, the base station 130 may be configured to apply one or more interference cancellation/rejection scheme(s) based on an advanced receiver (e.g., an LMMSE-IRC receiver, successive interference cancellation (SIC) receiver, and/or the like). The base station 130 may be configured to further utilize the assistance information from at least one neighbor base station 120 to estimate one or more effective channels of interfering links for a user equipment, in addition to its own channel.

With respect to an LMMSE-IRC receiver, the received signal vector is defined as y=Hs+n+i=Hs+r where H is the channel matrix between the receiver and transmitter and s, n and i are the transmitted signal, noise and transmitted interfering signal vectors, respectively. In this context, the base station 130 is the receiver and the neighbor base station 120 is the transmitter. The receiver can estimate the channel response H based on knowledge about reference signals, that is, pilot signals. In new radio, the DMRS are the training signals used for channel estimation and therefore, the pilot signals are used to obtain the interference covariance matrix. The interference covariance matrix of the received signal is defined as $C_y=\sigma_s^2 HH^H+R_r$, where $H^H$ is the hermitian channel matrix and $R_r$ is the interference covariance matrix.

In a LMMSE-IRC receiver, the covariance estimation relies on the knowledge obtained from the reference signals. LMMSE-IRC receiver requires interference plus noise covariance estimation which describes spatial properties of received inter-cell interference plus noise. For example, the raw interference plus noise covariance samples can be created differentially from the received samples at neighboring pilot subcarriers (so the estimation can be performed in parallel and independently of the channel estimation), assuming the channel remains approximately unchanged for two contiguous pilot subcarriers (e.g., M subcarriers pilot spacing). In this example, the interference plus noise covariance estimate for all subcarriers is defined as: $\hat{R}_r(f, k) = \hat{r}(f,k)\hat{r}^H(f, k)$ for $\hat{r}(f,k) = y(f, k) - s(f, k)s^H(f,k)y(f+M,k)$ In network assisted covariance estimation (such as NAICS), the base station 130 has knowledge about reference signals and precoding matrices used by neighbouring base stations 120. The interference covariance matrix consists of several interference covariance matrices. In other words, the receiving device estimates effective channels of multiple interference links. The generic form of the interference covariance matrix is defined as:

$$R_r = \sum_{i=1}^{N} \sigma_i^2 H_i H_i^H + \sigma_{No}^2 I$$

for N neighbor base stations.

In accordance with an example embodiment, the determination of the interference covariance matrix may be enhanced by muting potentially interfering uplink signals from the UE. As a result, the assistance information including, for example, the DMRS from the one or more neighboring cells 120 may be received by the base station 130 and utilized to determine the interference covariance matrix with more accuracy.

As also indicated by operation 510, the apparatus 300 associated with the base station 300 also includes means, such as the processor 302 or the like, configured to estimate a desired signal based on the interference covariance matrix. In an example embodiment, the signal processing approach to estimate a desired signal based on the interference covariance matrix may be in accordance with the following:

y=Hs+n+i=Hs+r as described above the LMMSE estimator can be written as $E[yy^H]$ $W_{LMMSE}=E[ys^H]$ where $E[yy^H]=C_y$ and $C_y=\sigma_s^2 HH^H + R_r$ where $E[ys^H]=C_{ys}$ and $C_{ys}=E[Hss^H+ns^H]=\sigma_s^2 H$ Therefore, the receive filter is $$w_{LMMSE} = C_y^{-1} C_{ys} = \left(\sigma_s^2 HH^H + R_r\right)^{-1} \sigma_s^2 H = \left(\sigma_s^2 HH^H + \sum_{i=1}^{N} \sigma_i^2 H_i H_i^H + \sigma_{N0}^2 I\right)^{-1} \sigma_s^2 H$$

As also indicated by operation 510, the apparatus 300 associated with the base station 300 also includes means, such as the processor 302 or the like, configured to estimate a desired signal based on the capabilities of the LMMSE receiver to suppress cross-link interference depending on the accuracy of the interference plus noise covariance matrix, thereby $R_r$. The receive filter for the LMMSE-IRC receiver can be written as $W_{LMMSE}=C_y^{-1}C_{ys}=(\sigma_s^2 HH^H + R_r)^{-1} \sigma_s^2 H$.

Figure 6A:
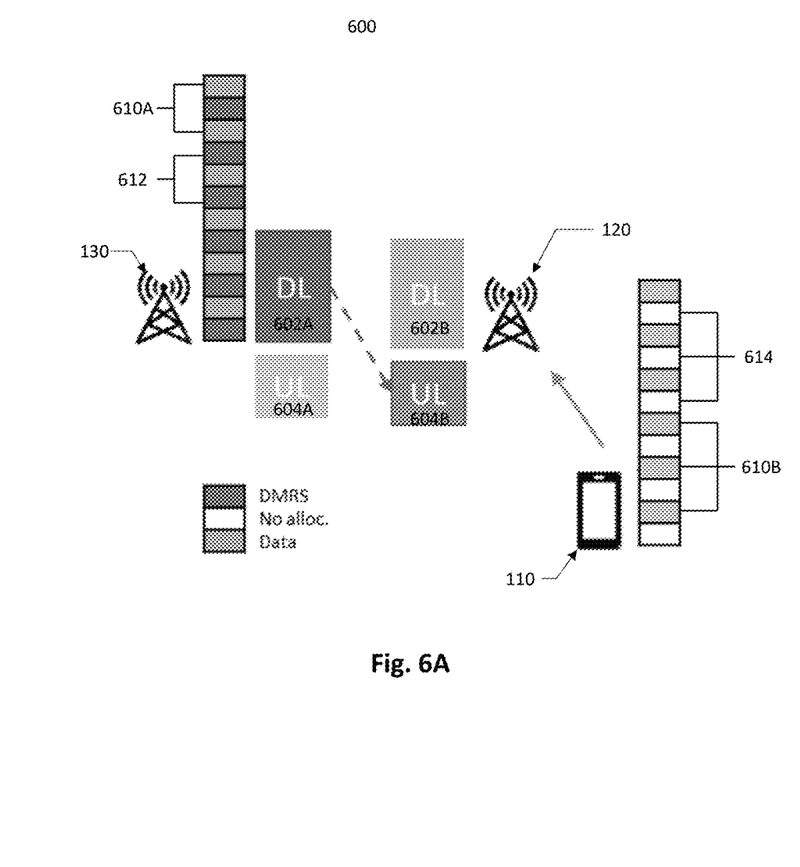
FIG. 6A illustrates an example configuration of muting patterns in accordance with an example embodiment of the present disclosure.
Figure 6B:
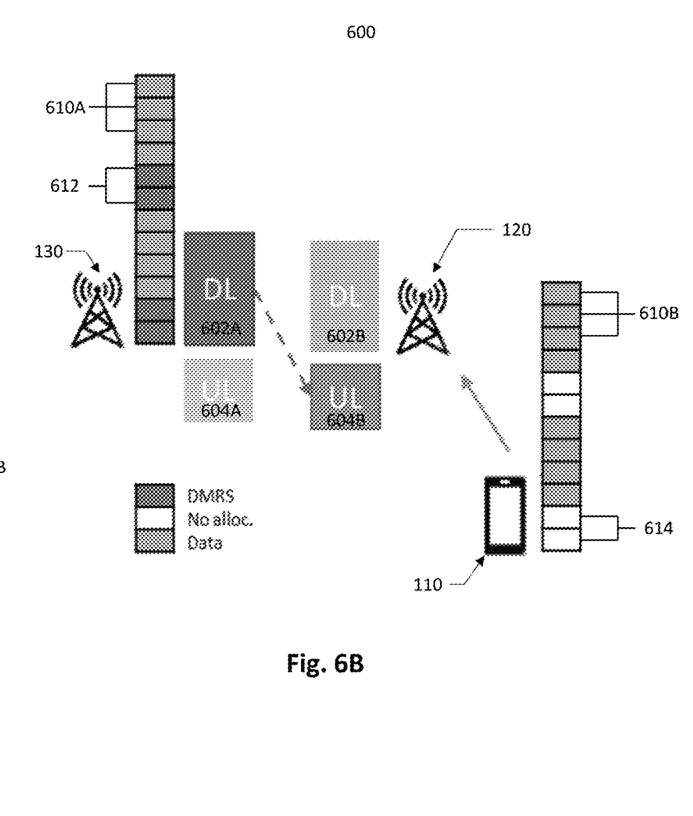
FIG. 6B illustrates another example configuration of muting patterns in accordance with an example embodiment of the present disclosure.

Referring now to FIGS. 6A-6B, example communication systems 600 demonstrating different time-frequency muting patterns are provided in accordance with various embodiments of the present disclosure. In various embodiments, the communication system 600 may comprise at least one user equipment (UE) 110, a base station 130 of a first cell, and/or at least one neighbor base station 120. In the depicted embodiments, the muting pattern of the base station 130 and/or the muting pattern of the UE 110 is illustrated. With reference to FIG. 6A, the base station 130 of an example embodiment may be configured to perform channel estimation to mitigate cross-link interference (CLI) between the base station 130 and at least one neighboring base station 120. The allocation in FIGS. 6A and 6B corresponds to only one OFDM symbol (carrying DMRS data) of one resource block (PRB) which, for example, may be formed of 12 resource elements or subcarriers. One example is depicted in FIG. 6A for one OFDM symbol within a slot carrying DMRS data for mapping type=A, configuration type=1 and CDMGroupsWithoutData=1 resulting in 6 subcarriers carrying DMRS and 6 subcarriers carrying other DL data. In the depicted embodiment, the base station 130 may be configured to determine one or more non-allocated resource element(s) 614 or subcarriers of the UE 110 to be utilized in order to mitigate CLI for the uplink (UL) reception 604B of the UE 110 by the downlink (DL) transmission 602A from the base station. In various embodiments, the base station may be configured with a time frequency muting pattern that is configured such that data 610A may be configured to occupy a first resource element followed by DMRS 612 that is configured to occupy a second resource element. In the depicted embodiment, the alternating pattern of data followed by DMRS is repeated for the base station. Further, the UE 110 may be configured with a time-frequency muting pattern that is configured such that data 610B may be configured to occupy a first resource element followed by a second resource element 614 that is not allocated. In the depicted embodiment, the alternating pattern of data followed by non-allocation is repeated for the UE. As shown, the data may be aligned in the first resource elements by the base station and the UE and the DMRS in the second resource element of the base station may be aligned with the non-allocated blocks of the UE, thereby allowing transmission of the DMRS without interference from the UE.

With further reference to FIG. 6A, in various embodiments, the base station 130 may be configured to estimate an effective channel between the base station 130 and the user equipment (UE) based on the operations described above. As described above and based on the pilots, e.g., the DMRS, from different links, the base station 130 can estimate its own effective channel in addition to the interference effective channels. In this regard, the DMRS from other links is signaled as part of the assistance information. The base station 130 may be configured to determine one or more non-allocated resource element(s) of the UE 110 and to then utilize the non-allocated resource elements in order to mitigate the cross-link interference (CLI) between the base station 130 and at least one neighbor base station 120.

With reference to FIG. 6B, in various embodiments, the base station 130 may be configured to perform channel estimation to mitigate cross-link interference (CLI) between the base station 130 and at least one neighboring base station 120. In the depicted embodiment, the base station 130 may be configured to determine one or more non-allocated resource element(s) 614 of the UE 110 in order to mitigate CLI for the uplink (UL) reception 604B of the base station 130 that might otherwise be created by the uplink (UL) transmission from the UE. In various embodiments, the neighboring base station 130 may be configured with a time frequency muting pattern such that data 610A may be configured to occupy any resource element and DMRS 612 may be configured to occupy any other additional resource element. In this regard and as noted above, the allocation in FIGS. 6A and 6B corresponds to only one OFDM symbol (carrying DMRS data) of one resource block (PRB) which may, for example, be formed of 12 resource elements or subcarriers. One example is depicted in FIG. 6B for one OFDM symbol within a slot carrying DMRS data for mapping type=A, configuration type=2 and CDMGroupsWithoutData=1 resulting in 4 subcarriers carrying DMRS and 8 subcarriers carrying other DL data. Further, the UE 110 may be configured with a muting pattern in a manner such that data 610B may be configured to occupy any resource element and any other resource element are not-allocated. Thus, the DMRS provided by the neighboring base station 130 may be aligned with the non-allocated blocks of the UE to avoid the UE generating interference over the DMRS resource used for base station-to-base station channel estimation, e.g., interference channel estimation.

With further reference to FIG. 6B, in various embodiments, the base station 130 may be configured to estimate an effective channel between the base station 130 and the user equipment (UE) based on the operation described above. The base station 130 may be configured to determine one or more non-allocated resource element(s) of the UE 110 in order to mitigate the cross-link interference (CLI) between the base station 130 and at least one neighbor base station 120 by configuring the DMRS to be transmitted in alignment with the non-allocated RBs of the UE as described above, thereby permitting the interference covariance matrix to be determined with enhanced accuracy.

In order to reduce the total uplink performance degradation, the base station 130 of an example embodiment is configured to not measure the channel in all DMRS symbols. For example, in an instance in which there are up to four DMRS symbols in a slot (e.g., pos0, pos1, pos2, pos3) as described in TS 38.211, only dmrs-AdditionalPosition equals to pos0 is specified to be used for the purpose of channel estimation in CLI slots. In another example, as a DMRS pattern may be front loaded to enable low latency applications with early decoding, a CLI-dmrs-position offset indication corresponding to one DMRS from the set of DMRS symbols (e.g., pos0, pos1, pos2 or pos3 in dmrs-AdditionalPosition) could be signaled to the UE to be used for the purpose of channel estimation in CLI slots. Alternatively, in case that the DMRS of the neighboring base station 120 and the UE served by the base station 130 collides, the base station 130 may be configured to indicate to the UE to mute its own DMRS transmissions, which might result in the base station 130 not being able to estimate the UL channel. To avoid this, the base station 130 could indicate to the UE to shift its DMRS transmission by n symbols within the UL slot.

It should be appreciated that the embodiments described herein are not restricted to the system that is given as an example, such as a 5G system, and that a person skilled in the art may apply the solution to other communication systems. Additionally, although described herein in the context of a base station performing, the method, the method may be performed by other types of apparatus, such as an apparatus associated with and/or in communication with a base station, in accordance with other example embodiments.

Furthermore, implementations of the various techniques described herein may be implemented in digital electronic circuitry, or in computer hardware, firmware, software, or in combinations of them. Implementations may be implemented as a computer program product, e.g., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer, or it may be distributed amongst a number of computers.

A computer program, such as the computer program(s) described herein, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

The operations of the method may be performed by one or more programmable processors executing a computer program or computer program portions to perform functions by operating on input data and generating output. The operations of the method also may be performed by, and an apparatus may be implemented as, special purpose logic circuitry, e.g., an FPGA (field programmable gate array) or an ASIC (application-specific integrated circuit).

It will be understood that each block of the flowchart(s) and combination of blocks in the flowchart(s) can be implemented by various means, such as hardware, firmware, processor, circuitry, and/or other communication devices associated with execution of software including one or more computer program instructions. For example, one or more of the procedures described herein can be embodied by computer program instructions. In this regard, the computer program instructions which embody the procedures described herein can be stored, for example, by the memory 304 of the apparatus 300 associated with the base station 130 or other apparatus employing an embodiment of the present disclosure and executed by the processor 302. As will be appreciated, any such computer program instructions can be loaded onto a computer or other programmable apparatus (for example, hardware) to produce a machine, such that the resulting computer or other programmable apparatus implements the functions specified in the blocks of the flowchart(s). These computer program instructions can also be stored in a computer-readable memory that can direct a computer or other programmable apparatus to function in a particular manner, such that the instructions stored in the computer-readable memory produce an article of manufacture the execution of which implements the function specified in the blocks of the flowchart(s). The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the blocks of the flowchart(s).

Accordingly, blocks of the flowchart(s) support combinations of means for performing the specified functions and combinations of operations for performing the specified functions for performing the specified functions. It will also be understood that one or more blocks of the flowchart(s), and combinations of blocks in the flowchart(s), can be implemented by special purpose hardware-based computer systems which perform the specified functions, or combinations of special purpose hardware and computer instructions.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
   causing an indication to be provided to at least one neighbor base station that assistance information to support interference channel estimation should be provided;

receiving assistance information from the at least one neighbor base station;

causing a time-frequency muting pattern to be signaled by a base station to at least one user equipment in a first cell based at least in part on the assistance information; and while the at least one user equipment is muted in accordance with the time-frequency muting pattern, estimating an interference covariance matrix from an interfering link of the at least one neighbor base station based at least in part on the assistance information and estimating a desired signal based on the interference covariance matrix.

2. The method of claim 1, wherein the assistance information comprises information regarding a demodulation reference signal (DMRS), and wherein the information regarding the DMRS comprises at least one of: one or more DMRS parameters of the at least one neighbor base station, one or more of the antenna ports of the at least one neighbor base station, a DMRS configuration profile of the at least one neighbor base station, or a default DMRS configuration of the at least one neighbor base station.

3. The method of claim 2, wherein the assistance information further comprises information regarding a frequency domain resource assignment of the DMRS from at least one neighbor base station.

4. The method of claim 2, wherein the assistance information further comprises information regarding a time domain resource assignment of the DMRS from at least one neighbor base station.

5. The method of claim 1, wherein causing the time-frequency muting pattern to be signaled comprises causing scheduling information regarding a frequency domain resource allocation and a time domain resource allocation to be provided to the at least one user equipment.

6. The method of claim 1, wherein causing the time-frequency muting pattern to be signaled comprises indicating to the at least one user equipment (UE) one or more uplink resources to mute based on a DMRS pattern.

7. The method of claim 6, wherein causing the muting pattern to be signaled comprises indicating to the at least one user equipment to mute a subset of orthogonal frequency division multiplexing (OFDM) symbols in which DMRS symbols are allocated.

8. The method of claim 6, wherein causing the muting pattern to be signaled comprises indicating to the at least one user equipment to mute across an entire bandwidth or to mute across a portion of the entire bandwidth based on a frequency domain resource assignment in the assistance information on orthogonal frequency division multiplexing (OFDM) symbols in which DMRS symbols are allocated.

9. The method of claim 6, wherein causing the muting pattern to be signaled comprises indicating to the at least one user equipment to shift DMRS transmission of the at least one user equipment away from DMRS symbols of at least one neighbor base station.

10. The method of claim 9, wherein at least a subset of orthogonal frequency division multiplexing (OFDM) symbols in which DMRS symbols are allocated after shifting is used for uplink channel estimation.

11. The method of claim 1, wherein causing the time-frequency muting pattern to be signaled comprises configuring the UE to mute a bandwidth for a demodulation reference signal (DMRS) symbol utilized for channel estimation in a cross-link interference slot.

12. An apparatus comprising:
at least one processor; and
at least one memory storing instructions that, when executed by the at least one processor, cause the apparatus at least to:
cause an indication to be provided to at least one neighbor base station that assistance information to support interference channel estimation should be provided;
receive assistance information from the at least one neighbor base station;
cause a time-frequency muting pattern to be signaled to at least one user equipment in a first cell based at least in part on the assistance information; and
while the at least one user equipment is muted in accordance with the time-frequency muting pattern, estimate an interference covariance matrix from an interfering link of the at least one neighbor base station based at least in part on the assistance information and estimate the desired signal based on the interference covariance matrix.

13. The apparatus of claim 12, wherein the assistance information comprise information regarding a demodulation reference signal (DMRS), and wherein the information regarding the DMRS comprise at least one of: one or more DMRS parameters of the at least one neighbor base station, one or more of the antenna ports of the at least one neighbor base station, a DMRS configuration profile of the at least one neighbor base station, or a default DMRS configuration of the at least one neighbor base station.

14. The apparatus of claim 13, wherein the assistance information further comprises information that regards a frequency domain resource assignment of the DMRS from at least one neighbor base station.

15. The apparatus of claim 13, wherein the assistance information further comprises information that regards a time domain resource assignment of the DMRS from at least one neighbor base station.

16. The apparatus of claim 12, wherein the time-frequency muting pattern to be signaled comprises schedule information regarding a frequency domain resource allocation and a time domain resource allocation to be provided to the at least one user equipment.

17. The apparatus of claim 12, wherein the time-frequency muting pattern to be signaled comprises an indication to the at least one user equipment (UE) of one or more uplink resources to mute based on a DMRS pattern.

18. The apparatus of claim 17, wherein the apparatus causes the muting pattern to be signaled by indicating to the at least one user equipment to mute a subset of orthogonal frequency division multiplexing (OFDM) symbols in which DMRS symbols are allocated.

19. The apparatus of claim 17, wherein the apparatus causes the muting pattern to be signaled by indicating to the at least one user equipment to mute across an entire bandwidth or to mute across a portion of the entire bandwidth based on a frequency domain resource assignment in the assistance information on orthogonal frequency division multiplexing (OFDM) symbols in which DMRS symbols are allocated.

20. The apparatus of claim 17, wherein the apparatus causes the muting pattern to be signaled by indicating to the at least one user equipment to shift DMRS transmission of the at least one user equipment away from DMRS symbols of at least one neighbor base station.

21. The apparatus of claim 20, wherein at least a subset of orthogonal frequency division multiplexing (OFDM) symbols in which DMRS symbols are allocated after shifting is used for uplink channel estimation.

22. The apparatus of claim 12, wherein the apparatus is caused to signal the time-frequency muting pattern by configuring the UE to mute a bandwidth for a demodulation reference signal (DMRS) symbol utilized for channel estimation in a cross-link interference slot.

23. A non-transitory computer-readable storage medium comprising program instruction stored thereon for perform at least the following:
    causing an indication to be provided to at least one neighbor base station that assistance information to support interference channel estimation should be provided;
    receiving assistance information from the at least one neighbor base station;
    causing a time-frequency muting pattern to be signaled by a base station to at least one user equipment in a first cell based at least in part on the assistance information; and
    while the at least one user equipment is muted in accordance with the time-frequency muting pattern, estimating an interference covariance matrix from an interfering link of the at least one neighbor base station based at least in part on the assistance information and estimating the desired signal based on the interference covariance matrix.

24. The non-transitory computer-readable storage medium of claim 23, wherein the assistance information comprises information regarding a demodulation reference signal (DMRS), and wherein the information regarding the DMRS comprises at least one of: one or more DMRS parameters of the at least one neighbor base station, one or more of the antenna ports of the at least one neighbor base station, a DMRS configuration profile of the at least one neighbor base station, or a default DMRS configuration of the at least one neighbor base station.

25. The non-transitory computer-readable storage medium of claim 24, wherein the assistance information further comprises information regarding frequency domain resource assignment of the DMRS from at least one neighbor base station.

26. The non-transitory computer-readable storage medium of claim 24, wherein the assistance information further comprises information regarding a time domain resource assignment of the DMRS from at least one neighbor base station.

27. The non-transitory computer-readable storage medium of claim 23, wherein causing the time-frequency muting pattern to be signaled comprises causing scheduling information regarding a frequency domain resource allocation and a time domain resource allocation to be provided to the at least one user equipment.

28. The non-transitory computer-readable storage medium of claim 23, wherein causing the time frequency muting pattern to be signaled comprises indicating to the at least one user equipment (UE) one or more uplink resources to mute based on a DMRS pattern.

29. The non-transitory computer-readable storage medium of claim 28, wherein causing the muting pattern to be signaled comprises indicating to the at least one user equipment to mute a subset of orthogonal frequency division multiplexing (OFDM) symbols in which DMRS symbols are allocated.

30. The non-transitory computer-readable storage medium of claim 28, wherein causing the muting pattern to be signaled comprises indicating to the at least one user equipment to mute across an entire bandwidth or to mute across a portion of the entire bandwidth based on a frequency domain resource assignment in the assistance information on orthogonal frequency division multiplexing (OFDM) symbols in which DMRS symbols are allocated.

31. The non-transitory computer-readable storage medium of claim 28, wherein causing the muting pattern to be signaled comprises indicating to the at least one user equipment to shift DMRS transmission of the at least one user equipment away from DMRS symbols of at least one neighbor base station.

32. The non-transitory computer-readable storage medium of claim 31, wherein at least a subset of orthogonal frequency division multiplexing (OFDM) symbols in which DMRS symbols are allocated after shifting is used for uplink channel estimation.

33. The non-transitory computer-readable storage medium of claim 23, wherein causing the muting pattern to be signaled comprises configuring the UE to mute a bandwidth for a demodulation reference signal (DMRS) symbol utilized for channel estimation in a cross-link interference slot.

* * * * *